INVENTOR
R DELL HULL

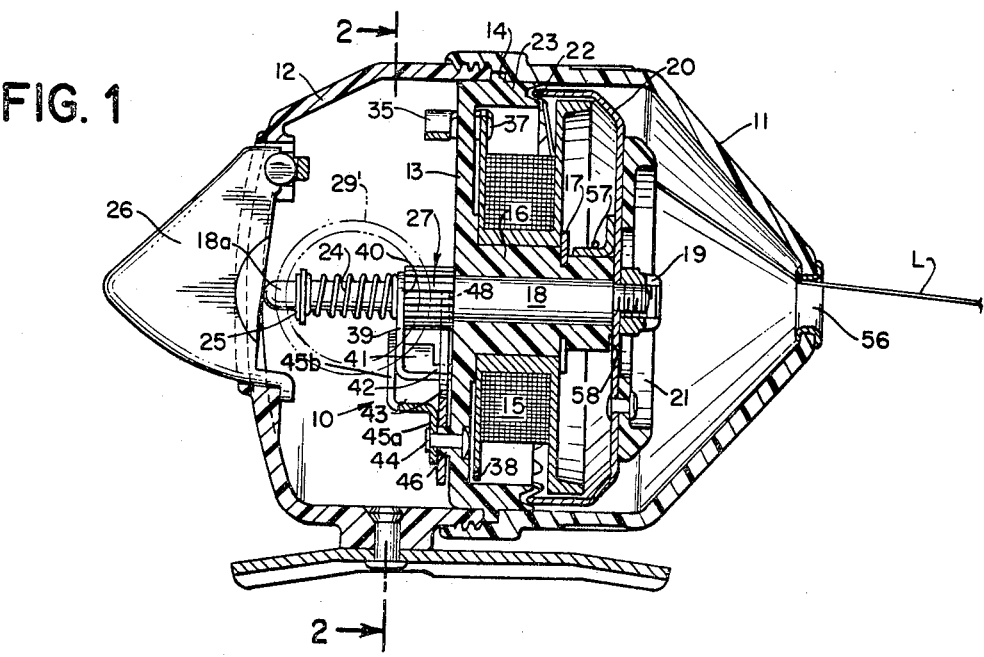

BY
Mandeville & Schweitzer
ATTORNEYS

United States Patent Office 3,489,365
Patented Jan. 13, 1970

3,489,365
SELECTIVELY ACTUATABLE ANTIREVERSE
MECHANISM FOR CLOSED FACE SPINNING
REELS
R. Dell Hull, 6101 E. Apache St.,
Tulsa, Okla. 74115
Continuation-in-part of application Ser. No. 390,610,
Aug. 19, 1964. This application May 8, 1967, Ser.
No. 636,853
Int. Cl. A01k 89/02
U.S. Cl. 242—84.2
12 Claims

ABSTRACT OF THE DISCLOSURE

An improved antireverse mechanism for use in a closed face spinning reel comprising a reel frame, a normally non-rotatable line spool mounted on a cylindrical support projecting forwardly from said frame, a spinner head mounted on a longitudinal main shaft supported in said frame for rotation about a predetermined axis, and gear train means connecting said shaft with a rotatable crank. The antireverse mechanism includes an actuating member maintained in slip friction drive with the face of one of the elements in said gear train, an antireverse element pivotably mounted in said reel frame adjacent one of the gears of said gear train, driving pin and slot means interconnecting said antireverse element with said actuating member, rotation of said element in a predetermined reverse direction causing said actuating member to drive said antireverse member into blocking engagement with said gear, rotation of said element in the other direction causing said actuating member to drive said member into a non-blocking relation with said gear; continued rotation of said gear in said other direction being accommodated by said slip friction drive, selectively actuatable control means pivotably mounted on said frame and having lever portions projecting outwardly of said reel frame through a radial slot therein, said control means including a cam surface which is adapted to engage said anti-reverse element and to maintain it in a non-blocking position, thereby accommodating reverse rotation of said one gear, when said lever is near one end of said slot, said cam surface being adapted to free said antireverse element for blocking engagement with said gear when said lever is near the other end of said slot.

CROSS REFERENCES TO RELATED APPLICATIONS

This application is a continuation-in-part of my co-pending application Ser. No. 390,610, filed Aug. 19, 1964, for "Selectively Actuable Anti-Reverse Mechanism for Closed Face Spinning Reel," now abandoned, and my co-pending application Ser. No. 557,752, filed June 15, 1966, for "Spinning Reel."

SUMMARY OF THE INVENTION

In the construction of fishing reels, it has been found desirable to incorporate into the reel a mechanism to prohibit uncontrolled rotation of the pickup head in the direction of line pay out, the reverse direction. The antireverse mechanism in effect allows only unidirectional cranking of the reel in the direction of line take up and prohibits operation in the line pay out direction, except under controlled drag tension. To that end most reels include a ratchet mechanism which can be set to engage with the cranking mechanism to prevent its operation in the reverse direction.

As an important aspect of the present invention, a new and improved selectively actuatable, antireverse mechanism has been provided for a spinning reel and, more particularly, for cooperation with the drive gear, itself, of a closed face spinning reel having a simplified construction and minimal numbers of parts. The new antireverse mechanism is completely silent in operation, in significant contrast to conventional ratchet and pawl arrangements, and provides smooth effortless operation during wind-up and other "forward" operation of the reel, even when the antireverse is in its "on" condition.

As a more specific aspect of the invention, the new antireverse mechanism is particularly adapted for use in spinning reels of the general construction shown in United States Patent No. 3,105,651, for "Closed Face Spinning Reel," which construction includes a spring biased main shaft supporting a pickup head and a drive gear mounted on the shaft. The new mechanism generally includes an actuating member rotatably mounted on the main shaft and maintained in low-friction, driveable contact with a selected gear of the drive train through the action of a spring. Advantageously, the spring may be that which is otherwise normally employed for biasing the main shaft in a rearward direction. The actuating member is drivingly associated with a pivoted blocking pawl which is mounted adjacent the selected gear and adapted to be displaced toward and away from the gear.

In accordance with the principles of the invention, rotation of the drive gear in a forward or line retrieval direction will cause the actuating member to be frictionally driven by the gear, which, in turn, will cause or tend to cause pivoting movement of the blocking pawl away from the gear. When rotation of the drive gear is reversed, the pawl will be driven into blocking engagement with the gear to prevent its rotation in the reverse direction. The frictional relationship between the drive gear and the actuating member is such that, when the actuating member is restrained, it may slip easily relative to the rotating gear so as to exert no significant restraint upon the normal winding operation of the reel.

As a further aspect of the invention, the mechanism is rendered selectively effective or ineffective through a control lever movable externally of the reel housing between "on" and "off" positions in which the antireverse mechanism is engaged and disengaged, respectively. More specifically, a portion of the control lever is located internally of the housing to restrain the locking pawl in an inactive remote position when the antireverse is "off" and, alternately, to allow the pawl to be freely driven into and out of its "antireverse" position by the actuating member when the antireverse mechanism is "on."

For a more complete understanding of the invention, reference should be made to the accompanying drawings, in which:

FIG. 1 is a cross-sectional view of a spinning reel incorporating a preferred embodiment of a new and improved, controllable antireverse mechanism embodying the principles of the invention;

FIG. 2 is a cross-sectional view of the reel of the invention, with the antireverse mechanism in its "off" position, taken along line 2—2 of FIG. 1;

FIG. 3 is a fragmentary, enlarged, cross-sectional view of the reel showing the antireverse mechanism in an "on" or operative position;

Figure 4:
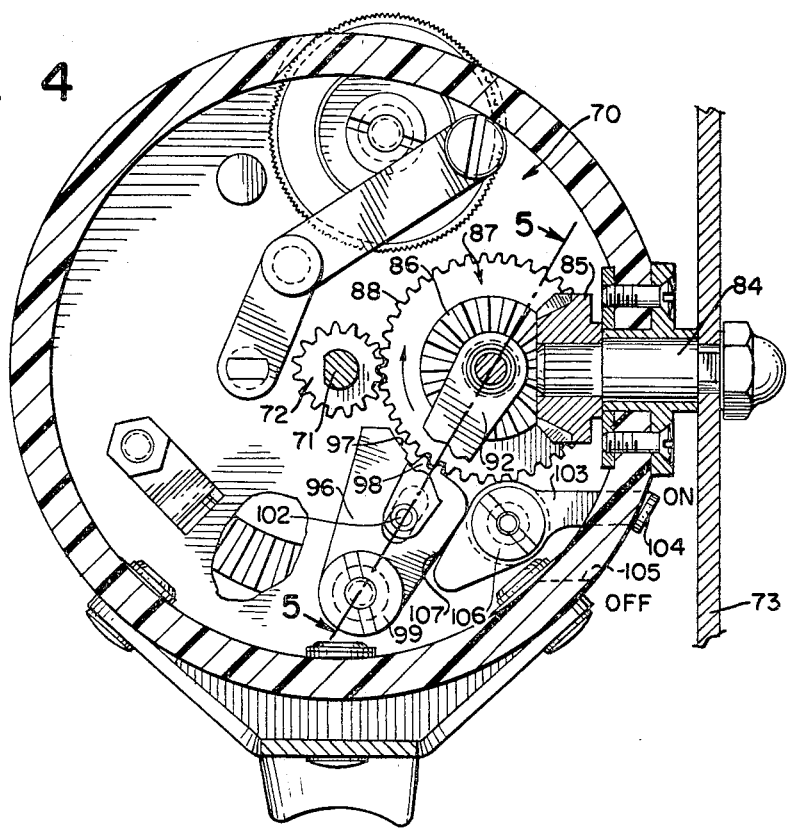
FIG. 4 is a cross-sectional view of a spinning reel incorporating an alternate preferred embodiment of the invention.

Referring now to FIG. 1, the new and improved antireverse mechanism is generally indicated by reference numeral 10 and is incorporated in a closed face spinning reel including a front housing cover 11 and a rear cover 12 joined by a threaded connection. Internally, the reel includes a mechanism subassembly mounted on a frame plate 13, which is clamped securely between the front and rear covers by means of a radial flange 14, as described in greater detail and claimed in my United States Patent No. 3,105,651.

A line spool 15 is mounted on a forwardly projecting hub 16 integral with the frame plate and is secured thereon and against the frame plate by a snap clip 17. A shouldered main shaft 18 is journaled for rotation in the hub 16 and extends axially of the reel as shown. Fixed to the forward end of the main shaft 18 by a slotted nut 19 is a scalloped pickup head 20, having a brake ring 21 affixed thereto. Details of the construction of the pickup head and its cooperation with a forwardly facing annular groove 22 in an axial flange 23 of the plate 13 may be had from my United States Patent No. 3,259,333.

The pickup head 20 is rotatable with the main shaft and is also axially movable therewith relative to the plate 13 between rearward, operative (for line retrieval), and forward, inoperative (for casting) positions. As shown, a coil spring 24 biases the main shaft rearwardly through a snap clip 25 into the operative position, from which it may be forwardly projected by a pivotable thumb lever 26. Rotation of the main shaft in a pickup direction (clockwise, as viewed from the rear of the reel in FIGS. 2 and 3) or a "reverse" (counterclockwise) direction is accomplished through a drive gear 27 slidably mounted on the reduced diameter portion 18a of the shaft and effectively, non-rotatably keyed thereto by a flat 28 formed in the shaft and on the gear (FIGS. 2 and 3). The drive gear 27 is rotated by a gear 29 which is mounted on a crank shaft 30 journaled in a plate extension 31. The crank shaft has a crank 32 suitably fixed to its outer end by a nut 33 to adapt it for manual rotation by the user of the reel.

An adjustable drag mechanism 34 is mounted on the frame plate 13 and cooperates with the line spool 15 to allow the spool to be rotated about the hub 16 when a predetermined excessive load is placed on the line L. The illustrated drag brake mechanism includes a leaf spring member 35 which is adjustably stressed by cam surfaces (not shown) on a control wheel 36. The free end 37 of the spring engages notched circumferential portions 38 of the line spool through an opening 61 in the plate 13 and tends to prevent the rotation of the spool. However, when the forces on the line exceed the restraining force exerted by the drag brake, the spool will rotate about the hub 16 to permit controlled pay out of the line.

In accordance with the invention, the selectively actuatable antireverse mechanism 10 is incorporated into the spinning reel structure described hereinabove, and includes a pivotable actuating member 39 rotatably supported through a circular opening 62 on the reduced portion 18a of the main shaft. As shown in FIG. 1, the actuating member is generally L-shaped and comprises one radially disposed leg having a friction surface 40 which engages the rearward face of the gear 27 and another leg 41 projecting forwardly toward the frame plate and having a reduced actuating finger 42 formed thereon. As an important aspect of the invention, the member 39 is held in a low-friction, driveable relation with the gear 27 and most advantageously by means of the spring 24 which biases the main shaft 18 rearwardly. The relationship between the gear 27 and the friction surface 40 is arranged to accommodate easy slippage of the actuating member when the latter is restrained relative to the gear, while at the same time providing sufficient driving force to rotate the unrestrained actuating member with the gear.

The antireverse mechanism further includes a pivotable blocking pawl 43 which is loosely, rotatably secured, as by a rivet 44 and the lower portion 45a of a retainer element 45, to a hub 46, integrally formed on the rear face of the frame plate 13. Mounting of the pawl 43 is such that it may be freely pivoted about the hub 46 by the actuating finger 42 or by a manual control lever 47, as will be described hereinafter. In accordance with the invention, the pawl includes a blocking portion 48, appropriately stepped and pointed to be blockingly engageable with the teeth 49 of the drive gear 27, as shown best in FIG. 3. Advantageously, the engagement of the blocking portion takes place without the mesh circle 29' of the gears 27, 29, as shown in FIG. 1. The pawl also includes a driving slot 50 for engagement with the actuating finger 42, and a control arm 51 for engagement with the manual control lever 47.

As a further specific aspect of the invention, the upper portion 45a of the duplex retainer element is offset and is arranged, as shown in FIG. 1, to limit the rearward axial displacement of the actuating member 39. In this manner, when the reel is partially disassembled (e.g., by removal of the spinnerhead 20) for spool changes and the like, escape of the actuating finger 42 from the slot 50 is prevented. During normal operation of the reel, the element 45 is maintained stationarily in the position shown in FIG. 2. However, for the purposes of assembly or complete disassembly of the reel, the element may be temporarily rotated clear of the pivoting range of the pawl 39, as indicated in phantom in FIG. 2.

The manual control lever 47 is pivotally mounted directly against the rear face of the frame plate by a rivet 52 and a crimped spring washer 53 in a manner that allows movement of the lever between its indicated "on" and "off" operating positions by a control extension 59 which projects outwardly of the rear housing covering through an opening 60. The spring washer 53 maintains the lever firmly against the frame plate by a clamping action in whatever position it is manually set.

A stop post 54 is formed as an integral part of the flange plate 13 and serves to limit the counterclockwise (as viewed in FIGS. 2 and 3) displacement of the control lever 47 when it is moved into the "on" position, as shown in FIG. 2. A similar post 55 is employed to bank the control portion 51 of the pawl in its inactive or "off" position, best shown in FIG. 2.

Operation of the new and improved reel is simplified and reliable. To prepare for a cast, the fisherman depresses the thumb lever 26, moving the main shaft 18 and pickup head 20 forward and pinching the line L between the inside of the front cover 11 and the brake ring 21. Release of the thumb lever during the cast will permit the pickup head to retreat to an intermediate position in which the line may freely unwind itself from the spool through the force of the cast to travel freely over the pickup head and through the central openings 56 of the front cover.

As described in detail in the aforementioned patent No. 3,259,333, the pickup head is held in the intermediate position by the cooperation of a spring actuated lever 57 and a cam surface 58 formed on the front surface of the hub extension 16. However, when the pickup head is thereafter rotated by the crank handle 32, the lever 57 is engaged by the cam surface 58 at the forward extremity of the hub extension, swinging the lever 57 out of locking position and permitting the main shaft and pickup head to be returned in a rearward direction by the biasing spring 24. As will be understood, this occurs within one revolution of the pickup head. Retrieval of the line is accomplished through the continued cranking of the crank handle 32, which will cause the rotation of the main shaft, driving the pickup head in a clockwise direction.

In accordance with the invention, the pickup head may be freely cranked in the line retrieval (clockwise) direction at all times, but may be selectively blocked from being cranked in the line pay out (counterclockwise) direction by the new and improved antireverse mechanism 10. Specifically, the antireverse mechanism may be put "on" by moving the control lever 47 through its extension 59, away from the blocking pawl and against the post 54 as shown in FIG. 3. In this position, rotation of the main shaft gear 27 in the retrieval direction will frictionally drive the actuating finger 42 in the clockwise direction, which finger will swing the pawl 43 into a banked position against the post 55.

With the pawl 43 banked against the post 55, the gear 27 may be freely rotated in the clockwise or pickup direction, while the friction surface 40 slips easily relative to the rearward surface of the gear 27. In accordance with the invention, rotation of the gear 27 in this direction continually urges the blocking pawl against the post 55 and away from blocking engagement with the gear teeth 49. However, when the crank direction is reversed, the gear 27 drives the friction surface 40 and the finger 42 counterclockwise, and the finger in turn drives the blocking portion 48 of the pawl into engagement with the gear teeth 49 (shown in FIG. 3), preventing reverse rotation of the pickup head 20. Unblocking of the gear may be achieved merely by cranking in the line retrieval direction or alternatively by moving the control lever extension 59 into the "off" position to drive the specially contoured blocking portion 48 out of engagement with the gear. The latter method of unblocking the drive gear 27 causes the control portion 51 of the pawl to be moved toward the gear 27 and to be held against the post 55 by the control lever 47 as shown in FIG. 2, while the former method allows the actuating finger 42 to drive the pawl control portion 51 against the post 55.

In the "off" postion, as will be understood, and in accordance with the principles of the invention, the crank may be freely rotated in either direction. With the pawl clamped against the post 55, the actuating finger 42 will be restrained in the slot 50 and the friction surface 40 of the actuating member will slip freely relative to the gear 27 as it is driven in either direction.

Figure 5:
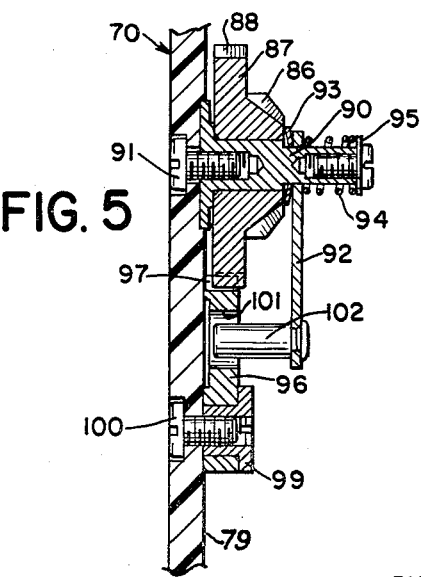
FIG. 5 is an enlarged, fragmentary, cross-sectional view of the reel of FIG. 4 taken along line 5—5 thereof.

In an alternate preferred embodiment, shown in FIGS. 4 and 5, the selectively anti-reverse mechanism of the invention is embodied in a closed face spinning reel of the general type including a reel frame member 70; an axially displaceable main shaft 71 with a pinion 72 non-rotatably keyed thereto; and a combination gear 87 in mesh with the pinion 72. The shaft 71 carries a pickup member at its forward end (not shown) and is rotated through the pinion 72 to retrieve paid out line. In all other material respects, the reel of FIG. 4 is similar in operation to the reel of FIG. 1.

As shown in FIG. 4, rotary motion of the pinion 72 is derived from rotation of an external crank 73 which in turn rotates a crank shaft 84 and a beveled gear 85 affixed on the inner end thereof, which beveled gear 85 cooperates with the bevel portion 86 of a combination gear 87. The spur gear portion 88 of the combination gear 87 meshes with the pinion 72 and completes the gear train connecting the crank 73 to the main shaft 71.

As shown best in FIG. 5, the gear 87 is mounted for rotation on a stepped stud 90 secured to the reel frame by a screw 91. Specifically, the rearward surfaces of the stud support an antireverse actuator 92 which is disposed in effective frictional or slip driving communication with the rearward surfaces of the gear 87 through an interposed friction disk 93. The requisite force for the frictional or slip drive between the actuator 92 and the gear 87 is provided by a coil spring 94 disposed between a flanged screw 95 at the end of the stud 90 and the actuator.

In accordance with the invention, an anti-reverse element 96, having involute portions 97 and blocking portions 98, is mounted for rotation beneath the gear 87 on a nut 99 secured to the frame rear wall 79 by a screw 100. The antireverse element 96 is rotated by a pin 102 projecting forwardly from the free end of the antireverse actuator 92 into a slot 101 formed in the antireverse element.

As will be understood, rotation of the gear 87 in the indicated clockwise direction (retrieval direction) will drive the blocking portion 98 of the antireverse element out of engagement with its teeth 88 through the above-described pin and frictional drive. Continued rotation of the gear 87 is accommodated by slipping of the gear 87 with respect to the actuator 92. However, reversal or counterclockwise rotation of the gear 87 will immediately cause the blocking portion 98 of the antireverse element to engage the spur gear teeth 88 and to prohibit further counterclockwise or "reverse" rotation. Advantageously, the involute portion 97 includes a plurality of teeth for meshing with gear 87, and the blocking portion 98 is of sufficient arcuate extent to bear against a plurality of gear teeth. This arrangement minimizes wear of the teeth of the gear 87 resulting from the antireverse action.

As explained hereinabove, in some instances it is desirable to make the antireverse element inoperative, i.e., to turn it "off," and to that end, the reel includes an antireverse control element 103. As shown in FIG. 4, the antireverse control includes a lever 104 which projects outwardly of the frame through an opening 105 and which is pivotable about a mount 106 which supports the control element at the rear wall of the reel frame adjacent the antireverse element 96.

The antireverse control includes a cam surface 107 which in its "off" position positively displaces the antireverse element 96 and holds the blocking portions 98 thereof out of stopping engagement with the gear teeth 88 regardless of the direction of rotation of the gear 87. The surface 107 is pivotable into an "on" position (FIG. 4) in which the antireverse element is operative in stopping rotation of the gear 87 in the reverse direction. In accordance with one specific aspect of the invention, in the "off" position the lever 104 will abut the lower wall of the slot 105 and when in the "on" position the lever will abut the upper wall of the slot 105.

Other aspects of the illustrated reels form the subject matter of and are covered by United States Patents Nos. 3,105,651 and 3,259,333, and co-pending application Ser. No. 557,752, filed June 15, 1966, the disclosures of which are considered as being incorporated herein by reference. Thus, while detailed descriptions of certain aspects of the illustrated reels have been omitted herefrom to avoid unnecessary repetition, reference may be made to United States Patents Nos. 3,105,651 and 3,259,333, and co-pending application Ser. No. 557,752, filed June 15, 1966, for further details regarding the construction and operation of other features of the reels.

It should be understood that the specific form of the reel herein illustrated and described are intended to be representative only, as certain changes may be made therein without departing from the clear teachings of the disclosure. Accordingly, reference should be made to the following appended claims in determining the full scope of the invention.

I claim:
1. An antireverse mechanism for a spinning wheel, comprising:
 (a) a shaft mounting a pickup head;
 (b) a bi-directionally rotatable gear supported by said shaft in normally non-rotatable relationship therewith;
 (c) an actuating member supported by said shaft in rotatable relationship therewith and in frictional, driving contact with said gear;
 (d) a coil spring biasing said shaft axially in a predetermined direction;
 (e) said spring also biasing said actuating member against said gear to enhance the frictional engagement therebetween;
 (f) a blocking pawl driveable by said actuating member toward and away from said gear, respectively into and out of the path of the teeth of said gear;
 (g) said pawl preventing the rotation of said gear in one direction when driven into engagement therewith;
 (h) said pawl accommodating the rotation of said gear when driven away from engagement therewith;
 (i) selectively actuatable control means adapted to restrain said pawl in a predetermined position free of engagement with said gear;

(j) said actuating member slipping freely relative to said gear when said pawl is restrained by said control means or otherwise in a position out of engagement with said gear;

(k) whereby said gear may be freely rotated in a predetermined forward direction at all times and may be selectively rotated in a reverse direction when said pawl is restrained by said control means.

2. An antireverse mechanism for a fishing reel assembly, including:
(a) a reel housing;
(b) a shaft rotatably supported in said housing and carrying a line pickup mechanism;
(c) a gear mounted on said shaft and being normally non-rotatable relative thereto;
(d) means for rotating said gear in either of two directions;
(e) a spring urging said shaft in a predetermined axial direction;
(f) an actuating member rotatably supported by said shaft and urged into a frictional driveable relationship with said gear by said spring;
(g) blocking pawl means pivotably supported in said housing and movable into and out of the path of the teeth of said gear;
(h) means connecting said blocking pawl and said actuating member and arranged such that said blocking pawl may be pivoted by said actuating member out of the path of said gear when the gear is driven in a predetermined forward direction and to be pivoted by said actuating member into the path of said gear blocking its movement when said gear is rotated in a reverse direction; and
(i) selectively actuatable control means being adapted to hold said blocking pawl in a position out of the path of said gear in which position said gear may be freely rotated in either direction;
(j) said actuating member upon being restrained slipping freely relative to said gear.

3. An antireverse mechanism in accordance with claim 2, in which:
(a) said actuating member is generally L-shaped and includes a first leg in face-to-face frictional contact with said gear and a second leg extending perpendicularly from said first leg substantially parallel with said shaft;
(b) said blocking pawl includes a slot engaged with said second leg and a contoured portion non-rotatably engageable with the teeth of said gear when said gear is rotated in said reverse direction.

4. An antireverse mechanism in accordance with claim 2, which includes:
(a) first stop means limiting the travel of said pawl in a direction away from and at a point remote from said gear; and
(b) second stop means limiting the travel of said control means in a direction away from and at a point remote from said pawl.

5. An antireverse mechanism in accordance with claim 2, in which:
(a) said pawl includes a stepped, contoured portion adapted to engage said gear and to prohibit the rotation thereof in said reverse direction while accommodating rotation of said gear in said predetermined forward direction.

6. In a closed face spinning reel comprising a reel frame, a normally non-rotatable line spool mounted on a cylindrical support projecting forwardly from said frame, a spinner head mounted on a longitudinal main shaft supported in said frame for rotation about a predetermined axis, and gear train means with intermeshing drive teeth connecting said shaft with a rotatable crank, an improved antireverse mechanism comprising;
(a) an actuating member having a planar friction surface portion;
(b) biasing means maintaining said planar friction surface portion in a slip friction drive relation with a gear element in said gear train means;
(c) an antireverse element pivotably mounted in said reel frame adjacent one of the gears of said gear train means for selective engagement therewith;
(d) driving pin and slot means interconnecting said antireverse element with said actuating member;
(e) rotation of said gear train means in a predetermined reverse direction causing said actuating member to drive said antireverse element into blocking engagement with the drive teeth of said one gear;
(f) rotation of said gear train means in the other direction causing said actuating member to drive said element into nonblocking relation with said teeth of said gear train means;
(g) continued rotation of said gear in said other direction being accommodated by said slip friction drive;
(h) selectively actuatable control means pivotably mounted on said frame and having lever portions projecting outwardly of said reel frame through a radial slot therein;
(i) said control means being pivotable between first and second predetermined positions;
(j) said control means including a control surface which is adapted to engage said antireverse element and to maintain it in a non-blocking position, thereby accommodating reverse rotation of said one gear, when said control means is in said first predetermined position;
(k) said control surface being adapted to free said antireverse element for blocking engagement with said gear when in said second predetermined position.

7. The antireverse mechanism of claim 6, in which
(a) a retaining means is carried by said reel frame and is adapted to maintain said driving pin and slot means operatively interconnected.

8. The antireverse mechanism of claim 7, in which
(a) said retaining means includes a first portion retaining said antireverse element in said frame and a second portion offset from said first portion and limiting the axial displacement of said actuating member relative to said antireverse element.

9. The antireverse mechanism of claim 6, in which:
(a) said antirverse element includes involute and blocking portions.

10. The antireverse mechanism of claim 6, in which:
(a) said one gear is a gear disposed intermediately of said crank and a pinion secured to said main shaft.

11. The antireverse mechanism of claim 6, in which:
(a) said one gear and said actuating member are maintained in said slip friction drive by an independent spring means.

12. The antireverse mechanism of claim 6, in which:
(a) said biasing means comprises a coil spring;
(b) said coil spring maintains said actuating member in said slip friction drive with a gear supported on said main shaft and biases said shaft axially in a predetermined direction.

References Cited

UNITED STATES PATENTS

| | | | |
|---|---|---|---|
| 1,347,661 | 7/1920 | Rhoades | 188—82.4 X |
| 1,492,668 | 5/1924 | Bond | 188—82.4 |
| 1,799,017 | 3/1931 | Junghals | 74—546 |
| 2,705,113 | 3/1955 | Bonanno | 242—84.21 |
| 2,931,592 | 4/1960 | Sloan | 242—84.2J |
| 3,041,002 | 6/1962 | Hull. | |

FOREIGN PATENTS 20,845    2/1961    Germany.

BILLY S. TAYLOR, Primary Examiner

U.S. Cl. X.R.

242—84.5